United States Patent
Konno et al.

(10) Patent No.: US 6,393,034 B1
(45) Date of Patent: May 21, 2002

(54) LASER APPARATUS AND LASER PROCESSING APPARATUS

(75) Inventors: Susumu Konno; Shuichi Fujikawa; Tetsuo Kojima, all of Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 0 days.

(21) Appl. No.: 09/477,706

(22) Filed: Jan. 5, 2000

(30) Foreign Application Priority Data

Jan. 26, 1999 (JP) .......................................... 11-016935

(51) Int. Cl.$^7$ ................................................. H01S 3/11
(52) U.S. Cl. ............................ 372/10; 372/10; 372/95; 372/22; 372/26; 372/99; 372/27
(58) Field of Search .................... 372/10, 17, 92, 372/99, 22, 26, 27, 28, 30, 106, 95

(56) References Cited

U.S. PATENT DOCUMENTS

| | | | |
|---|---|---|---|
| 4,346,314 A | | 8/1982 | Craxton |
| 5,022,033 A | * | 6/1991 | Hackell ........................ 372/25 |
| 5,119,385 A | * | 6/1992 | Aoshima et al. .............. 372/23 |
| 5,278,852 A | | 1/1994 | Wu et al. |
| 5,315,608 A | * | 5/1994 | Choi et al. ..................... 372/41 |
| 5,321,709 A | * | 6/1994 | Beausoleil .................... 372/22 |
| 5,388,113 A | * | 2/1995 | Oka ........................... 372/102 |
| 5,483,374 A | | 1/1996 | Tanuma |
| 5,838,709 A | * | 11/1998 | Owa .......................... 372/109 |
| 5,892,789 A | | 4/1999 | Yasui et al. |

FOREIGN PATENT DOCUMENTS

| | | |
|---|---|---|
| DE | 196 01 951 | 1/1996 |
| JP | 850797 | 9/1996 |
| WO | 96/08116 | 3/1996 |

OTHER PUBLICATIONS

Dyer, "Unstable Resonators", The Physics and Technology of Laser Resonators, Bristol, 1989, Chapter 2, pp. 21–29.

Le Garrec et al., "High–Average–Power Diode–Array–Pumped Frequency–Doubled YAG Laser", Optics Letters, vol. 21, No. 24, Dec. 1996, pp. 1990–1992.

Chang et al., "315 W Pulsed–Green Generation With A Diode–Pumped Nd: YAG Laser", Conference on Lasers and Electric Opticx (CLEO), 1998, Post Deadline Papers CPD2–1.

* cited by examiner

Primary Examiner—Frank G. Font
Assistant Examiner—Delma R. Flores-Ruiz
(74) Attorney, Agent, or Firm—Leydig, Voit & Mayer, Ltd.

(57) ABSTRACT

An intracavity wavelength conversion laser apparatus has a stable resonator in which a solid-state laser active medium, a resonator Q-value modulating element, and a wavelength conversion crystal, a nonlinear element, are arranged along a laser optical axis for generating a Q pulse wavelength conversion laser beam. A mirror constituting the stable resonator, which is positioned close to the wavelength conversion crystal, is a convex mirror, whereby the Q pulse wavelength conversion laser beam has a short pulse width. The laser apparatus is easily operated with high efficiency and has a small size. The Q pulse wavelength conversion laser beam is generated with excellent reproducibility and stability, and the wavelength conversion crystal is less susceptible to optical damage.

16 Claims, 8 Drawing Sheets

Polarizing direction 1
(solid line)

Polarizing direction 2
(dotted line)

US 6,393,034 B1

LASER APPARATUS AND LASER PROCESSING APPARATUS

BACKGROUND OF THE INVENTION

1. Field of the Invention

The present invention relates to a laser apparatus and a laser machining apparatus of an intracavity wavelength conversion type, which converts a wavelength by placing a wavelength conversion crystal in a resonator.

2. Discussion of Background

FIG. 14 is a structural view of a conventional laser apparatus disclosed in JP-A-8-250797. In FIG. 14, numerical reference 25 designates a resonator mirror having a high reflectance with respect to a fundamental laser beam. Numerical references 2c, 2d designate solid-state laser active mediums. Numerical reference 9a designates a 90 degree polarization rotator. Numerical reference 4b designates a second harmonic generation wavelength conversion crystal. Numerical reference 6b designates a fundamental laser beam. Numerical reference 5b designates a laser optical axis of the fundamental laser beam. Numerical reference 3b designates a folding and outcoupling mirror having a high reflectance with respect to the fundamental laser beam and high transmittance with respect to the second harmonic laser beam. Numerical reference 26 designates a resonator mirror having a high reflectance with respect to the fundamental beam and second harmonic laser beam. The second harmonic generation wavelength conversion crystal 4b is provided with an optimum phase matching means by changing an angle and temperature of the frequency conversion crystal.

In the laser apparatus shown in FIG. 14, a part of the fundamental laser beam, which is generated by the mirrors 25, 26, the 90 degree polarization rotator 9a, and the solid-state laser active mediums 2c, 2d, is converted into a second harmonic laser beam by the second harmonic generation wavelength conversion crystal 4b placed inside of a resonator and extracted from a laser beam folding mirror 3b. In this laser apparatus, one of the resonator mirrors configurating the resonator is a convex mirror, and the other mirror 26 on a side close to the second harmonic generating wavelength conversion crystal 4b is a concave mirror. The second harmonic generation wavelength conversion crystal 4b is positioned where the diameter of the fundamental wave laser beam 6b is narrowed by a function of the resonator.

In the laser apparatus shown in FIG. 14, as the 90 degree polarization rotator 9a is positioned between the laser active mediums 2c, 2d, it is possible to improve stability and efficiency of a laser system by compensating the birefringence and the bifocusing of the two laser active mediums.

FIG. 15 is a structural view showing a laser apparatus disclosed in "Solid State Laser Engineering" (3rd Edition) by W. Koechner. In FIG. 15, numerical reference 25a designates a resonator mirror having a concave curvature. Numerical reference 8b designates a resonator Q switching element. Numerical reference 2e designates a laser active medium. Numerical reference 5c designates a laser optical axis of a fundamental wave laser beam. Numerical reference 3c designates a folding and outcoupling mirror, which has a high reflectance with respect to the fundamental wave laser beam and a high transmittance with respect to second harmonic laser beam. Numerical reference 4c designates a second harmonic generation wavelength conversion crystal. Numerical reference 26a designates a mirror having a concave curvature, the mirror has a high reflectance with respect to the fundamental wave-laser beam and the second harmonic laser beam. In this apparatus, the second harmonic generation wavelength conversion crystal 4c is positioned at where the fundamental laser beam is narrowed by a function of the laser resonator like the apparatus illustrated in FIG. 14.

In a second harmonic laser beam generation apparatus constructed as in FIG. 15, a part of a fundamental Q pulse laser beam, which is generated by the resonator mirrors 25a, 26a, the reflective mirror 3c, the laser active medium 2e, and the Q-switching element 8b, is converted into second harmonic laser beam by the second harmonic generation wavelength conversion crystal 4c and extracted from the mirror 3c.

In the laser systems, illustrated in FIGS. 14 and 15, the wavelength conversion crystal is positioned at where the laser beam diameter is narrowed in the vicinity of the concave mirror. As the wavelength conversion efficiency of the wavelength conversion crystal becomes high as the beam intensity increases, the wavelength conversion crystal is generally placed at where the laser beam is focused. A concave mirror is ordinarily used as the resonator mirror.

In thus constructed second harmonic laser beam generation apparatus, since the concave mirror is used as the resonator mirror, on at least a side in which the wavelength conversion crystal is positioned, the length of the resonator is increased, whereby a compact wavelength conversion laser apparatus could not be fabricated. Further, the resonator has low stability with respect to a vibration of the resonant mirror. Further, it is difficult to generate a wavelength conversion pulse laser beam with a narrow pulse width. In addition, when one tries to improve the output power and the efficiency of the system, wavelength conversion crystal is apt to be damaged. Meanwhile, in case that a wavelength conversion crystal having a small nonlinear constant is used, it is difficult to obtain high frequency conversion efficiency.

SUMMARY OF THE INVENTION

It is an object of the present invention to solve the above-mentioned problems inherent in the conventional laser apparatus and to provide an intracavity wavelength conversion laser apparatus, in which the pulse width is short; operation is easy; reproducibility and stability are excellent; a wavelength conversion crystal is less susceptible to damages; and the size is compact.

Another object of the present invention is to provide a wavelength conversion laser apparatus, which demonstrates high efficiency even in case when a wavelength conversion crystal has a small wavelength conversion coefficient.

Another object of the present invention is to provide a laser machining apparatus, which is easily and stably operated. And it is possible to process finely with high accuracy at high speed.

Another object of the present invention is to provide a laser apparatus, which is easily operated and could excite another laser system, stably and efficiently.

According to a first aspect of the present invention, there is provided a laser apparatus having a stable resonator and a mirror, wherein the stable resonator includes a solid-state laser active medium, a Q factor modulating element, and a wavelength conversion crystal, and the convex mirror positioned on a side in the vicinity of the wavelength conversion crystal.

According to a second aspect of the present invention, there is provided the laser apparatus according to the first aspect of the invention, wherein the wavelength conversion crystal for generating a second harmonic laser beam is a type II phase matching type LBO ($LiB_3O_5$) crystal.

According to a third aspect of the present invention, there is provided the laser apparatus according to the first and second aspects of the invention, wherein at least one polarization controlling element is inserted inside of the resonator.

According to a fourth aspect of the present invention, there is provided the laser apparatus according to the first through third aspects of the invention, wherein an output power of a wavelength converted Q pulse laser beam is 50W or more.

According to a fifth aspect of the present invention, there is provided a laser machining apparatus, wherein the wavelength converted laser beam, generated from the laser apparatuses, according to the first through fourth aspects of the invention is used for processing.

According to a sixth aspect of the present invention, there is provided the laser apparatus according to the first through fourth aspects of the invention, wherein the wavelength converted laser beam, generated from the above laser apparatuses, is used as a beam source for extracavity wavelength conversion, by which the wavelength is converted by inserting a wavelength conversion crystal along optic axis of the wavelength converted laser beam.

According to a seventh aspect of the present invention, there is provided the laser apparatus according to the first through fourth aspects of the invention, wherein the laser beam having the converted wavelength, generated from the laser apparatuses, is used for exciting other laser's active mediums.

BRIEF DESCRIPTION OF THE DRAWINGS

A more complete appreciation of the present invention and many of the attendant advantages thereof will be readily be obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 13 as follows, wherein the same numerical references are used for the same or similar portions and description of these portions is omitted.

Embodiment 1

Figure 1:
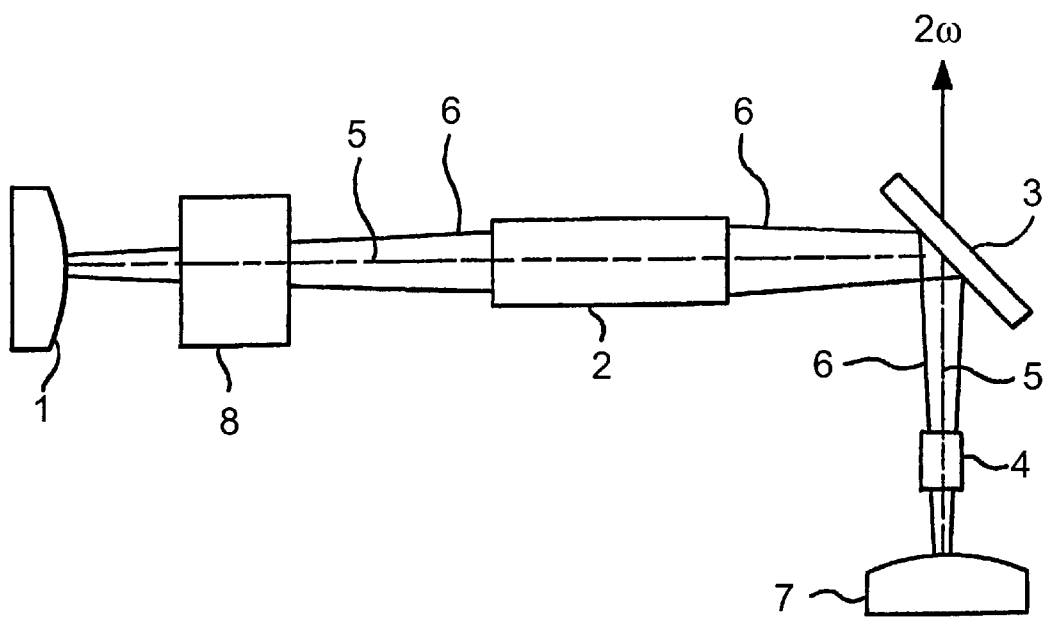
FIG. 1 is a structural view illustrating a wavelength conversion laser apparatus according to Embodiment 1 of the present invention.

FIG. 1 illustrates a structure of Embodiment 1. In FIG. 1, numerical reference 1 designates a resonant mirror having a high reflectance with respect to a fundamental laser beam; numerical reference 2 designates a solid-state laser active medium; numerical reference 3 designates a second harmonic laser beam extraction mirror besides functioning as a reflective mirror, which has a high reflectance with respect to the fundamental wave laser beam and a high transmittance with respect to the second harmonic laser beam; numerical reference 4 designates a wavelength conversion crystal for generating a second harmonic laser beam; and numerical reference 5 designates a laser optical axis of the fundamental laser beam and the second harmonic laser beam. Numerical reference 6 designates an oscillating fundamental laser beam. Numerical reference 7 designates a resonant mirror having a high reflectance with respect to the second harmonic laser beam and the fundamental laser beam. In FIG. 1, the curvatures of the resonator mirrors 1, 7 are convex. Further, threre is provided an optimum phase-matching means, for example, by angle tuning and/or temperature tuning of the wavelength conversion crystal 4 for generating the second harmonic.

In the wavelength conversion laser apparatus constructed as in FIG. 1, a part of a fundamental Q pulse laser beam, which is generated by the resonator mirrors 1,7, the solid-state laser active medium 2 excited by a pumping source such as a semiconductor laser or a lamp (not shown), the mirror 3 functioning as the reflective mirror with respect to the fundamental laser beam, and the Q factor modulating element 8, is converted into the second harmonic laser beam by the wavelength conversion crystal 4. The thus generated second harmonic laser beam (2ω) is extracted from the folding mirror 3.

In thus constructed laser apparatus, the wavelength conversion crystal 4 is positioned in the vicinity of the convex resonator mirror 7. The position of the wavelength conversion crystal 4 is not where the laser beam 6 in the resonator is focused. However, in this laser apparatus, because an oscillating pulse width becomes narrow and pulse peak intensity becomes high, it is possible to obtain high wavelength conversion efficiency, even though the wavelength conversion crystal is not in the position where the laser beam is focused. In other words, although a wavelength conversion crystal is positioned at where a laser beam is focused in an ordinary wavelength conversion laser, it is possible to provide an operation and an effect, which are not obtained in the conventional technique, at a point that the wavelength conversion crystal is not positioned at where the laser beam is focused in the present invention.

Figure 2:
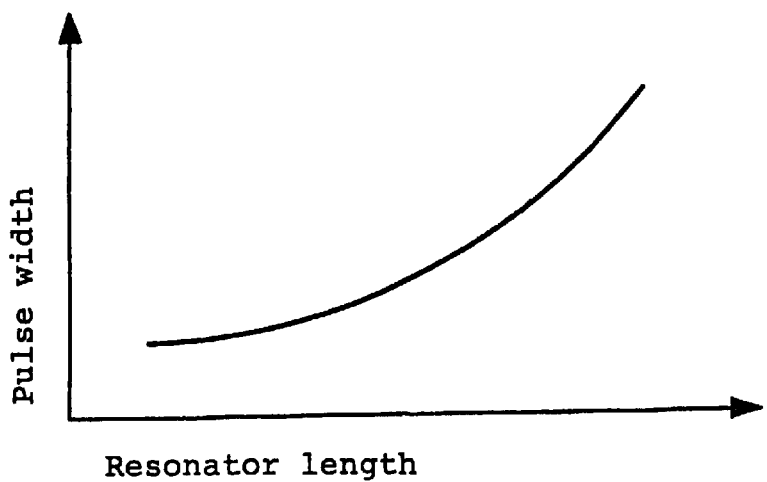
FIG. 2 schematically shows a dependence of pulse width on resonator length.

FIG. 2 schematically shows a dependence of a Q-switching pulse width, which depends on the length of the resonator, wherein the pulse width becomes narrow, as the length of the resonator becomes short. In Embodiment 1 of the present invention illustrated in FIG. 1, as described below, since the length of the resonator is shortened while maintaining a good beam quality, it is possible to generate the Q-switched pulse beam having a shorter pulse width, high pulse peak, and good beam quality.

Further, in a high output power laser, beam intensity is high even though a wavelength conversion crystal is not positioned at where a beam is focused. Further, the beam diameter of the wavelength conversion crystal is small enough to obtain high frequency conversion efficiency, because the focal length of the thermal lens of a laser active medium is short in the high output power laser, thus in highly pumped laser system. Accordingly, it is possible to obtain high frequency conversion efficiency. Specifically, such an effect is conspicuous in case that an output of the wavelength conversion laser is 50W or more. Further, there is an effect that the wavelength conversion crystal is hardly damaged when it is not in a position where the beam is focused in case of such a high output laser.

Hereinbelow, a relation between a focusibility of the beam extracted from the resonator and a region where stable oscillation is possible, which changes depending on a curvature of the resonator mirror and the length of the resonator, in the laser system which have active mediums having the property of the thermal lens, which s inherent in the high output power laser, will be described.

When a solid-state laser apparatus is operated, a solid-state laser active medium is heated mainly by excitation, whereby the solid-state laser active medium has the property of the thermal lens. Hereinbelow, a case that the solid-state laser active medium has the property of a positive thermal lens focal length like in Nd:YAG will be described.

Figure 3:
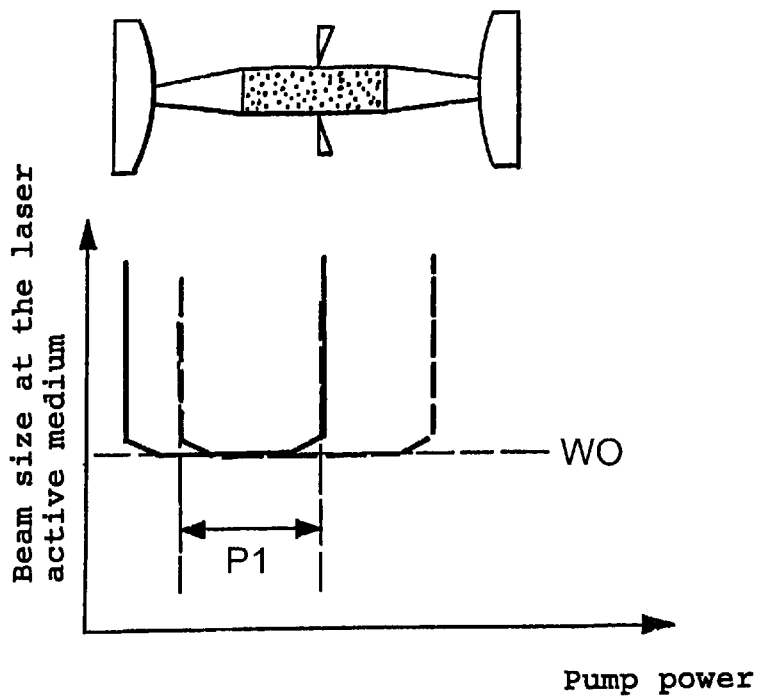
FIG. 3 shows a shape of a laser beam mode in a laser resonator utilizing a convex mirror, and a beam mode size at the laser active medium as a function of pump light intensity.
Figure 4:
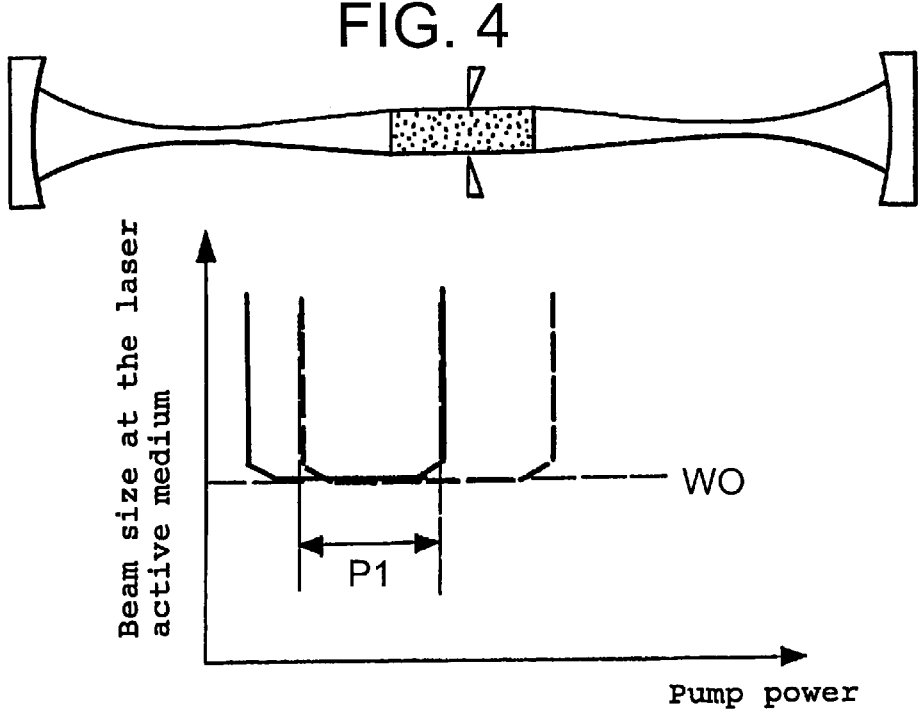
FIG. 4 shows a shape of a laser beam mode in a long laser resonator utilizing a concave mirror, and a beam mode size at the laser active medium as a function of pump light intensity.
Figure 5:
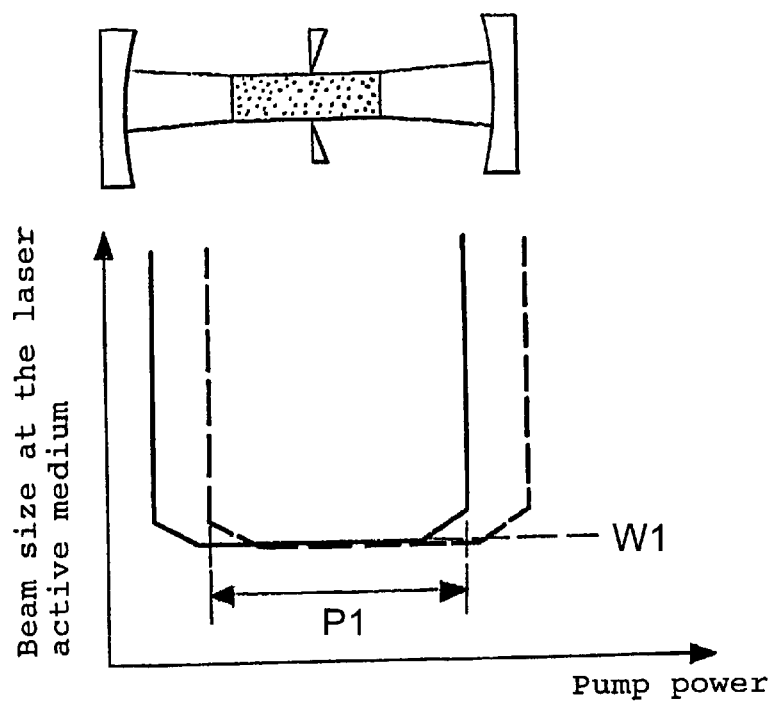
FIG. 5 shows a shape of a laser beam mode in a short laser resonator utilizing a concave mirror, and a beam mode size at the laser active medium as a function of pump light intensity.
Figure 6:
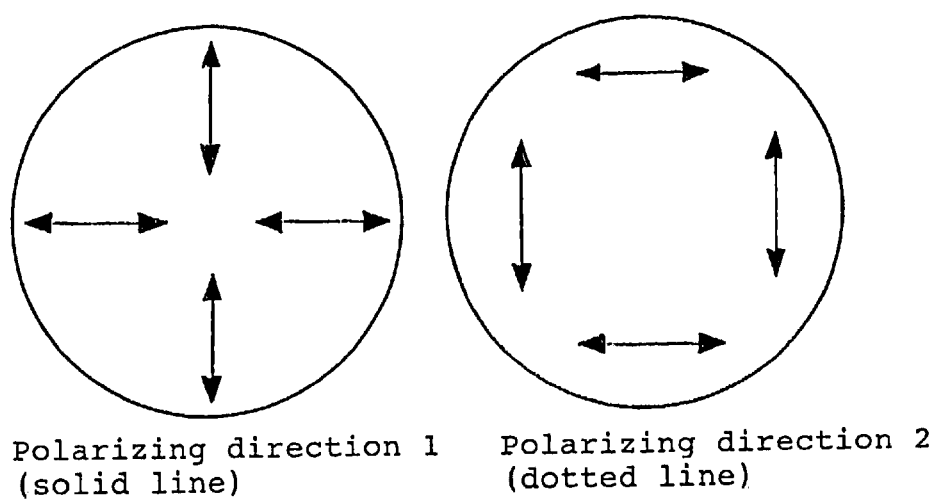
FIG. 6 shows two polarizing directions in a cross section of a laser active medium in a rid shape.

FIG. 3 shows a resonator using two convex mirrors. FIG. 4 shows a long resonator using two concave mirrors. FIG. 5 shows a short resonator using two concave mirrors. In FIGS. 3 through 5, shapes of lase beam modes in the resonators and changes of calculated values of eigen mode beam diameters at a position of the laser active mediums with respect to excitation intensity are schematically shown. The resonator mirrors in FIGS. 4 and 5 have same curvatures. Further, the pictures in FIGS. 3 through 5 are about a case that the laser active mediums are a rod type. Solid lines of the eigen mode beam diameters are calculated using index of refraction of a polarizing component in radial directions, i.e. polarizing direction 1 in FIG. 6, in a cross section of the rod, and dotted lines are calculated using index of refraction of polarizing component in tangential directions, i.e. polarizing directions 2 in FIG. 6, in the cross section of the rod.

Focusibility of the laser beam extracted from the laser resonator becomes better as the eigen mode beam diameter at the position of the laser active medium becomes large, and becomes worse as the eigen mode beam diameter becomes small. A stable oscillation is possible at a position where a beam diameter at the position of the active medium, which depends on the index of refraction in the radial directions, represented by the solid line, and a beam diameter at the position of the active medium which depends on the index of refraction o the polarizing component in the tangential directions, represented by a dotted line, overlap. In other words, the stable oscillation is possible in the excitation intensity ranges, represented by numerical references P1 and P2 in FIGS. 4 and 5.

When the eigen mode beam diameters, represented by w0 in FIG. 4 and w1 in FIG. 5, at the position of th laser active medium of the resonator are compared, w1 in FIG. 5 corresponding to a shorter resonator length is smaller. Further, the region P2 in FIG. 5, in which the calculated values of the beam diameters subjected to both types of polarization, i.e. the dotted line and the solid line, are equal, is wider than the region P1 in FIG. 4. In these regions P1 and P2, stable oscillation is obtainable. As a result, although focusibility of the beam extracted from the resonator shown in FIG. 5 is worse than that of the resonator shown in FIG. 4, the region of the excitation intensity, in which the stable operation is obtainable, is wider in the resonator shown in FIG. 5.

In the next, FIGS. 3 and 4 will be explained. When the convex mirrors having proper curvatures are used and a distance between the convex mirrors is properly selected as in FIG. 3, a beam waist, where the beam is focused, does not exist in the resonator as shown in FIG. 3. Therefore, it is possible to shorten the length of the resonator while maintaining the position 5 and the width P1 of the stable operation region in the excitation intensity, and the diameter of the beam mode in the stable operation region could be almost the same as that in FIG. 4. Oscillating characteristics of these resonators are compared in Table 1. As known from Table 1, when the convex mirror is used, the length of the resonator is shortened while maintaining the oscillating characteristics, such as the output power, the beam focusibility, the width of stable operation region, almost the same as, that of the resonator, in which the concave mirror is used.

TABLE 1

|  | FIG. 3 | FIG. 4 | FIG. 5 |
| --- | --- | --- | --- |
| Mirror curvature | Convex | Concave | Concave |
| Length of resonator | Short | Long | Short |
| Stable operation region | Narrow (P2) | Narrow (P2) | Wide (P1) |
| Beam focusibility | Good | Good | Bad |

Although, the resonator, which consists of concave, or flat mirrors could be shortened by inserting lense inside the resonator, there are drawbacks such that, a resonator loss increases and sensitivity in aligning the optical elements increases.

Hereinbelow, a practical example will be described using calculation for proving that the short resonator using the convex mirror does not require highly accurate mirror alignment in comparison with the long resonator using the concave mirror.

Figure 7:
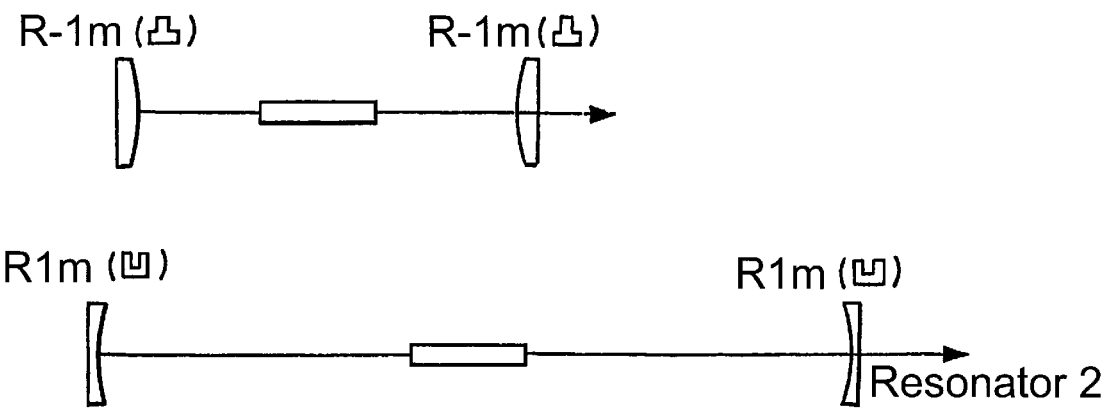
FIG. 7 schematically shows resonators for comparing a case in which a convex mirror is used as a resonator mirror and a case in which a concave mirror is used as the resonator mirror.
Figure 8:
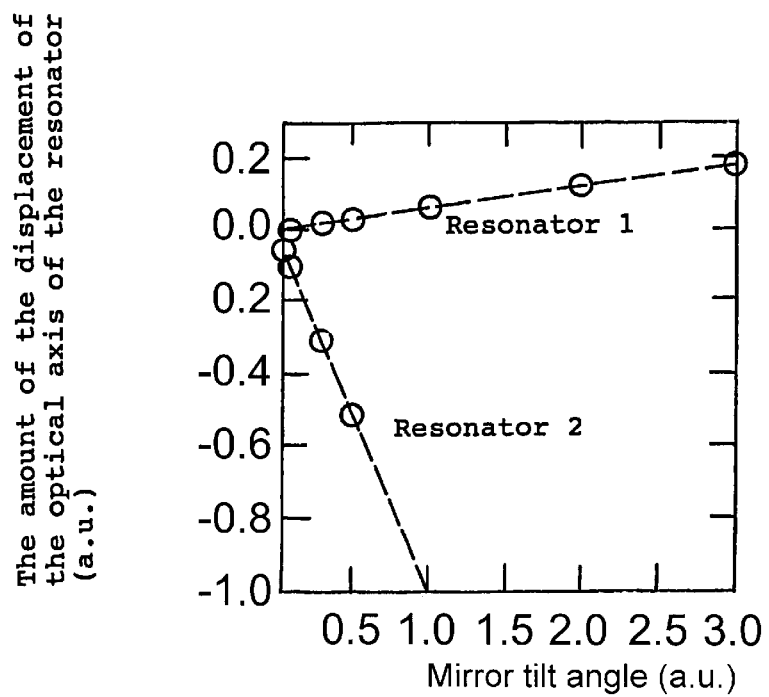
FIG. 8 shows a comparison between the calculated magnitudes of beam deviations at a position of a laser active medium with respect to an angular change of the mirror in the two resonators in FIG. 7.

The resonator 1 is schematically illustrated in FIG. 7, in which two convex mirrors of a curvature of 1 m are included. The cavity length of resonator 1 is 780 mm. A resonator 2 is also schematically illustrated in FIG. 7, wherein the resonator 2 has two concave mirrors of a curvature of 1 m, and the cavity length is 1,780 mm. These resonators have almost identical focusibility and stable operation zone like the resonators compared in FIGS. 3 and 4. FIG. 8 shows that how much optical axes of the resonators at positions of laser active mediums are shifted from centers when angles of the mirrors are changed. It is known that the resonator 1 has a much smaller shift of the optical axis at the position of the laser active medium in comparison with the resonator 2, as shown in FIG. 8.

Because a laser output power becomes small as the magnitude of the shift of the optical axis at the position of the laser active medium becomes large, a fluctuation of the output caused by vibration of the resonant mirror is larger in the resonator 2 than in the resonator 1. Further, when one tries to find optimum angles of the resonator mirrors, where a maximum output power is obtainable, a higher accuracy is required in the resonator 2 than in the resonator 1. By constructing the short resonator using the convex mirror, it is possible to constitute an apparatus, which is less susceptible to vibration of optical components and highly accurate alignment is not required.

When optical elements such as a resonator mirror and a wavelength conversion crystal are aligned in an intracavity wavelength conversion laser apparatus, the optical elements are aligned to satisfy an optimum condition for laser oscillation in addition to an optium phase matching condition of an SHG crystal. In other words, in a fundamental wave oscillating laser apparatus, which does not include a wavelength conversion crystal inside of a resonator, only the alignment of the resonator mirror is required. However, in case of the intracavity wavelength conversion laser apparatus, an alignment of the wavelength conversion crystal is further required. Therefore, in intracavity frequency conversion lasers, it is extremely effective that the highly accurate mirror alignment is not required in comparison with the fundamental wave oscillating laser apparatus. Further, because the apparatus is hardly affected by the variation of the angle of the wavelength conversion crystal, the laser apparatus becomes extremely stable.

In the present invention, it is firstly proved that an extremely stable laser can be provided by applying the resonator using the convex mirror to the wavelength conversion laser, and firstly proved that the resonator using the convex mirror has priority to the resonator using the concave mirror by considering the magnitude of the shift of the optical axis with respect to the above-mentioned angle change of the mirror.

Although the case that the second harmonic laser beam is generated by positioning only the second harmonic generation wavelength conversion element inside of the resonator is described in Embodiment 1 illustrated in FIG. 1, it is also possible to constitute a laser apparatus by positioning a sum-frequency generation element inside of a resonator, for example, arranging a plurality of frequency conversion crystals such as a wavelength conversion crystal for generating second harmonic and a wavelength conversion crystal for generating a third harmonic so that a Q pulse sum-frequency laser beam having a narrow pulse width is highly efficiently generated.

Although, in Embodiment 1 illustrated in FIG. 1, the case that the single Q-switching element is used, it is possible to obtain hold-off, i.e. complete stoppin of laser oscillation, in an intracavity wavelength conversion laser apparatus having a high output by enhancing diffraction efficiency using the plurality of the Q-switching elements. Further, in case that the diffraction efficiency of the Q-switching element changes depending on a relationship between a polarization direction of a laser beam and a propagating direction of acoustic wave of the Q-switching element, it is possible to construct the laser apparatus by arranging two Q-switching elements so that propagating directions of a plurality of acoustic waves in Q-switching elements are perpendicular in order to enhance diffraction efficiency.

Embodiment 2

Figure 9:
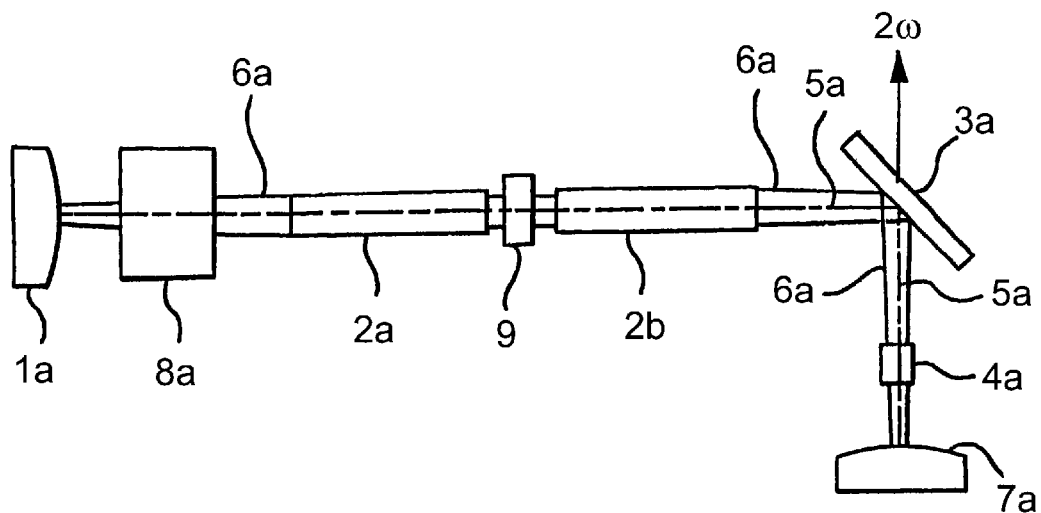
FIG. 9 is a structural view illustrating a laser apparatus according to Embodiment 2 of the present invention.

FIG. 9 shows a structure of a laser apparatus of Embodiment 2. In FIG. 9, numerical reference 1a designates a resonator mirror having a high reflectance with respect to a fundamental wave laser beam. Numerical references 2a, 2b designate solid-state laser active mediums. Numerical reference 3a designates a second harmonic laser beam extracting mirror besides functioning as a reflective mirror having a high reflectance with respect to the fundamental wave laser beam and a high transmittance with respect to a second harmonic laser beam. Numerical reference 4a designates a wavelength conversion crystal for generating the second harmonic Numerical reference 5a designates an optical axis of laser oscillation. Numerical reference 6a designates a fundamental wave laser beam. Numerical reference 7a designates a resonator mirror having a high reflectance with respect to the second harmonic laser beam and the fundamental wave laser beam. Numerical reference 9 designates a 90 degree polarization rotator. In FIG. 9, curvatures of the resonator mirror 1a and 7a are convex. Further, an optimum phase matching means, for example, by tuning an angle and/or a temperature of the wavelength conversion crystal 4a for generating the second harmonic is provided.

In the wavelength conversion laser apparatus constructed as in FIG. 9, a part of a Q pulse fundamental wave laser beam, which is generated by the laser resonator mirrors 1a, 7a, the mirror 3a functioning as a reflective mirror with respect to the fundamental wave, the solid-state laser active mediums 2a, 2b excited by a pumping source such as a semiconductor laser and lamp (not shown), a Q-switching element 8a, and the 90 degree polarization rotator 9, is converted into a second harmonic laser beam by the wavelength conversion crystal 4a for generating the second harmonic. Thus generate second harmonic laser beam (2ω) is extracted from the mirror 3a.

In the wavelength conversion laser apparatus constructed as in FIG. 9, because a bifocusing in the laser active mediums 2a, 2b depending on polarizing directions is canceled by positioning the 90 degree polarization rotator 9 between the laser active mediums 2a, 2b, it is possible to ensure a wider stable oscillation region than in a conventional technique. Further, because the resonator mirror is a convex mirror, it is possible to realize a more compact apparatus than in the conventional technique, and it is possible to highly efficiently generate a Q-switched pulse wavelength conversion beam having a shorter pulse width and higher peak intensity.

In Embodiment 2, a sum-frequency generation apparatus may be constituted by positioning a plurality of wavelength conversion crystals in an inside of the resonator; and a plurality of Q-switched elements may be used, or two Q-switched elements may be arranged so that propagating directions of acoustic waves in Q-switching elements are perpendicular.

Further, although in Embodiments 1 and 2, both of the resonator mirrors are the convex mirrors, as long as at least the mirror on a side of the wavelength conversion crystal is a convex mirror and the other mirror, for example, a plane mirror or a concave mirror, the effect that the wavelength conversion crystal is less susceptible to damage does not change despite the above-mentioned effects are spoiled a little.

Embodiment 3

In Embodiment 3, a LBO (LiB$_3$O$_5$) crystal of type II phase matching is used as a wavelength conversion crystal in the structure of intracavity Q pulse wavelength conversion laser illustrated in FIGS. 1 and 9. Hereinbelow, a reason why a short resonator using a convex mirror is advantageous in case of intracavity frequency conversion with a LBO (LiB$_3$O$_5$) crystal of type II phase matching.

An effective wavelength conversion coefficient d$_{eff}$ of the wavelength conversion crystal is associated with wavelength conversion efficiency based on the following formulas.

$$k\, d_{eff}^2; \text{ and} \qquad \text{(Formula 1)}$$

$$P_{2\omega}=kP\omega^2, \qquad \text{(Formula 2)}$$

where Pω represents a fundamental beam power in he crystal; and P$_{2\omega}$ represents a second harmonic power to be generated.

From formula 1, the wavelength conversion efficiency of the type II phase matching LBO crystal having a small effective wavelength conversion coefficient is about one-several tenths of the wavelength conversion efficiency of the KTP crystal and about one-several ones of the type I phase matching LBO crystal because a square of the effective wavelength conversion coefficient is in proportion to the wavelength conversion efficiency as known from Formula 1. On the other hand, the type II phase matching LBO crystal has advantages in generating a high output second harmonic beam in that (1) optical damage threshold is high; (2) second harmonic generation is possible with random polarization fundamental laser beam; and (3) the refractive index is less susceptible to a temperature change.

In the conventional laser systems, the type II phase matching LBO crystal is rarely used for the second harmonic generation because of the low wavelength conversion efficiency. In order to actually use the type II phase matching LBO crystal, the crystal should be long, wherein it is technically difficult to produce a long crystal while keeping a good crystal quality, and a production cost of the long crystal is expensive. Even though it is actually used, an output of the second harmonic is low in comparison with KTP crystal and so on. It is firstly found that the structure of the resonator utilizing the convex mirror combined with the type II phase matching LBO crystal is advantageous to improve the output and the efficiency and to make a pulse width short. Further, the second harmonic beam having excellent focusability, ten times or less of diffraction limited with a second harmonic average output power of 140 W or more, is attained.

Figure 10:
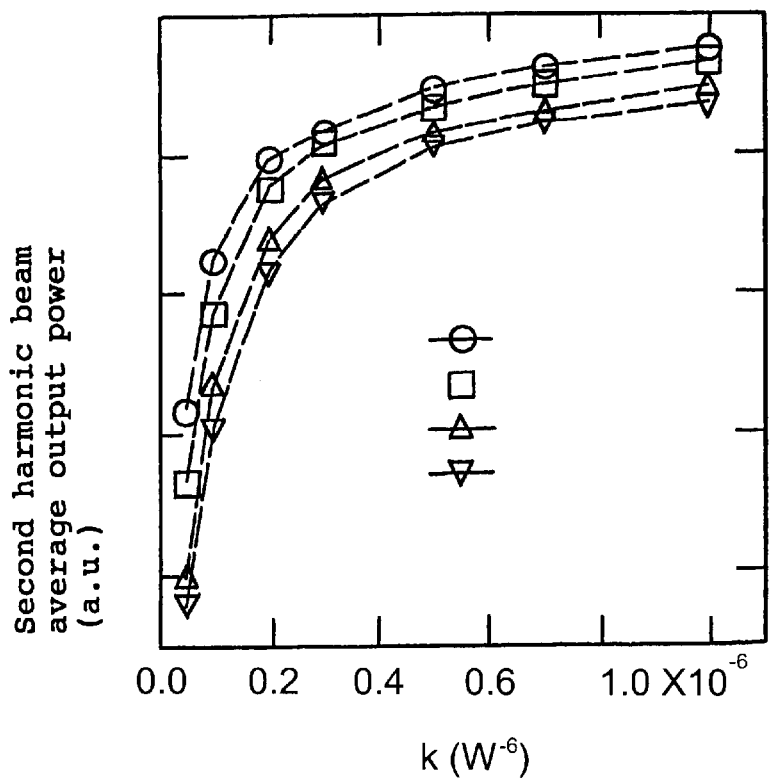
FIG. 10 is a graph showing a result obtained by calculating second harmonic outputs with respect to a wavelength conversion coefficient for resonators with different resonator lengths for a Q-switched laser of an internal wavelength conversion type.

Hereinbelow, a reason why a short resonator is advantageous to achieve the high output and the high efficiency in a Q pulse intracavity wavelength conversion will be theoretically described. FIG. 10 shows a result of calculated second harmonic outputs depending on the resonator length 1c among 0.5 m , 0.7 m, 1 m, 1.2 m, and 1.5 m using a simulator, in which a time boundary condition is set so as to describe an actual system by rate equations of Formulas 3 and 4. In other words, a condition similar to that in actual Q-switched laser oscillation is reproduced by the calculation with a periodical change of a resonator loss derived by a Q-switching element. Formulas 3 and 4 are as follows.

$$\frac{d\phi}{dt} = \frac{c}{2l_c}[2\sigma nl\phi - L\phi - k\phi^2]; \text{ and} \qquad \text{(Formula 3)}$$

$$\frac{dn}{dt} = -\sigma nl\phi, \qquad \text{(Formula 4)}$$

where Φ represents a photon density; c represent a light velocity; σ represents a stimulated-emission cross section; n represents a population inversion density; L represents a resonator loss; k represents a constant in proportion to a wavelength conversion coefficient; 1c represents the length of the resonator; and 1 represents the length of laser active medium.

From FIG. 10, it is known that a higher second harmonic output is obtainable as the resonator length becomes shorter. Particularly in case that a short resonator is used in a region having a small k of 3×10$^{-7}$ or less, a region, in which a high output is obtainable, exists. Generally in case that the KTP crystal or the type I phase matching LBO crystal or cases similar thereto, the wavelength conversion coefficient does not become small as such. In case of using the type II phase matching LBO crystal, the wavelength conversion coefficient becomes small as such. Meanwhile, it is possible to use a further long crystal as a method for increasing the wavelength conversion coefficient. However, such a long crystal has drawbacks that it is costly and alignment becomes complicated because a phase matching acceptance angle of the wavelength conversion crystal is narrow. In case that the type II phase matching LBO crystal is used as a wavelength conversion element, because its wavelength conversion coefficient is small, there exists a region, in which efficiency of second harmonic laser beam generation enhanced by shortening the resonator length using a convex mirror. This finding is firstly obtained from the results of the calculation described above using a calculation code and of an experiment.

Embodiment 4

Figure 11:
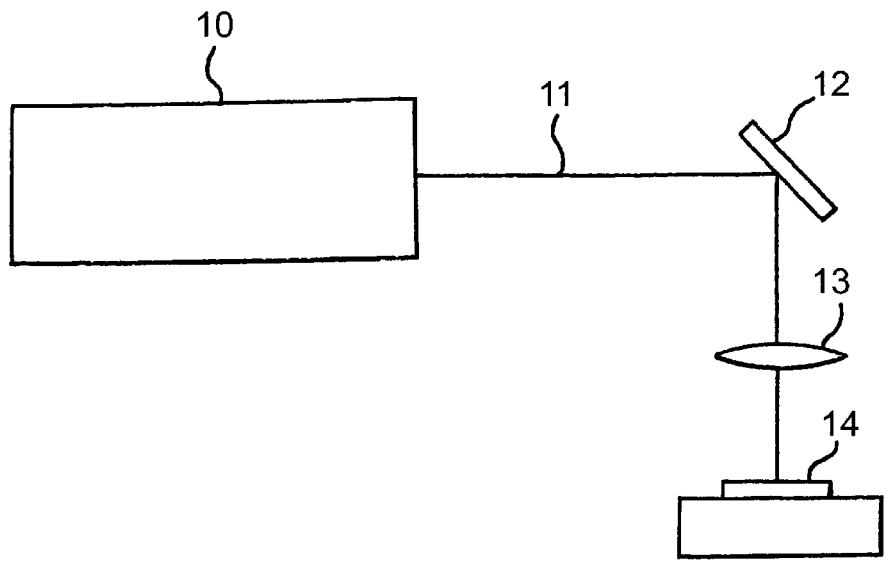
FIG. 11 is a structural view schematically illustrating a laser machining apparatus according to Embodiment 4 of the present invention.

FIG. 11 is a structural view illustrating Embodiment 4 of the present invention. In FIG. 11, numerical reference 10 designates a laser apparatus illustrated in Embodiment 1 through 3; numerical reference 11 designates an optical axis of a laser beam; numerical reference 12 designates a reflective mirror for the laser beam; numerical reference 13 designates a laser beam focusing and shaping element; and numerical reference 14 designates a workpiece to be processed.

In a processing device as constructed in FIG. 11, the laser beam generated in the laser apparatus 10 illustrated in FIG. 1 or 9 is reflected by the reflective mirror 12, focused and shaped by the laser beam focusing and shaping element 13, and reaches the workpiece 14. Because the laser beam 11, which is generated by the laser apparatus 10 illustrated in Embodiment 1 through 3, has good focusibility, stability, and high efficiency, it is possible to provide fine and accurate processing.

Embodiment 5

Figure 12:
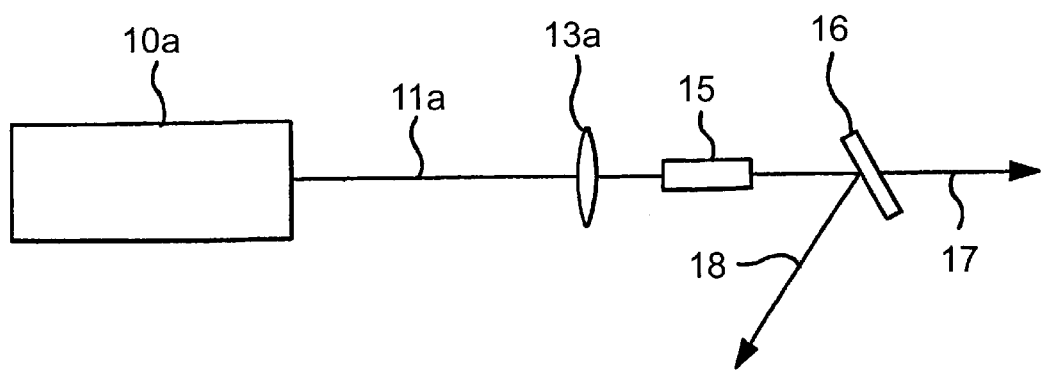
FIG. 12 is a structural view illustrating a laser apparatus according to Embodiment 5 of the present invention.

FIG. 12 is a structural view of Embodiment 5. n FIG. 12, numerical reference 10a designates a laser apparatus for generating second harmonic laser beam illustrated in FIG. 1 or 9; numerical reference 11a designates an optical axis of a laser beam; numerical reference 13a designates a laser beam focusing and shaping element; numerical reference 15 designates a wavelength conversion crystal for generating fourth harmonic beam such as CLBO (CsLiB6O10) and BBO (β-BaB204), as an additional wavelength conversion crystal; and numerical reference 16 designates a beam splitter mirror which has high transmittance with respect to the fourth harmonic laser beam and high reflectance with respect to the second harmonic laser beam.

In the thus-constructed laser apparatus, the second harmonic laser beam generated by the laser apparatus for generating the second harmonic on an axis 11a and is focused and shaped by the laser beam focusing and shaping element 13a, and reaches the wavelength conversion crystal 15 for generating the fourth harmonic and is converted into the fourth harmonic laser beam. The thus-generated fourth harmonic laser beam and the rest of the second harmonic laser beam, which is not converted, are separated into a fourth harmonic laser beam 17 and a second harmonic laser beam 18 and extracted from the beam splitter mirror 16.

It is possible to obtain a highly efficient forth harmonic laser beam generating device because the second harmonic laser beam generated in the laser apparatus illustrated in Embodiment 1 through 3 has a high output, high convergence, and a short pulse width.

Although, in FIG. 12, only a process of generating the fourth harmonic laser beam is illustrated, it is not limited to the fourth harmonic generation. A third harmonic laser beam may be generated by transmitting a fundamental laser beam along with the second harmonic laser beam to a sum-frequency wavelength conversion crystal. Further, a fifth harmonic laser beam may be generated by transmitting a fourth harmonic laser beam and the fundamental laser beam to a sum-frequency wavelength conversion crystal. Further, any sum-frequency generation and any harmonic generation may be conducted.

Embodiment 6

Figure 13:
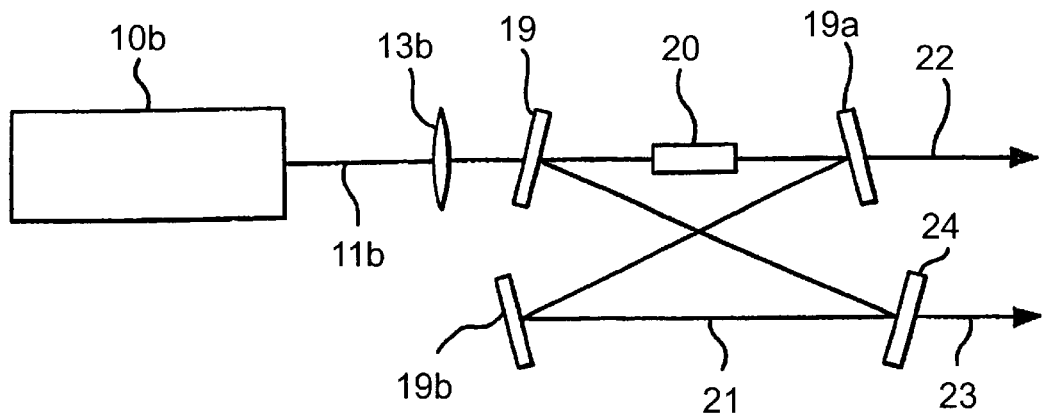
FIG. 13 is a structural view illustrating a laser apparatus according to Embodiment 6 of the present invention.
Figure 14:
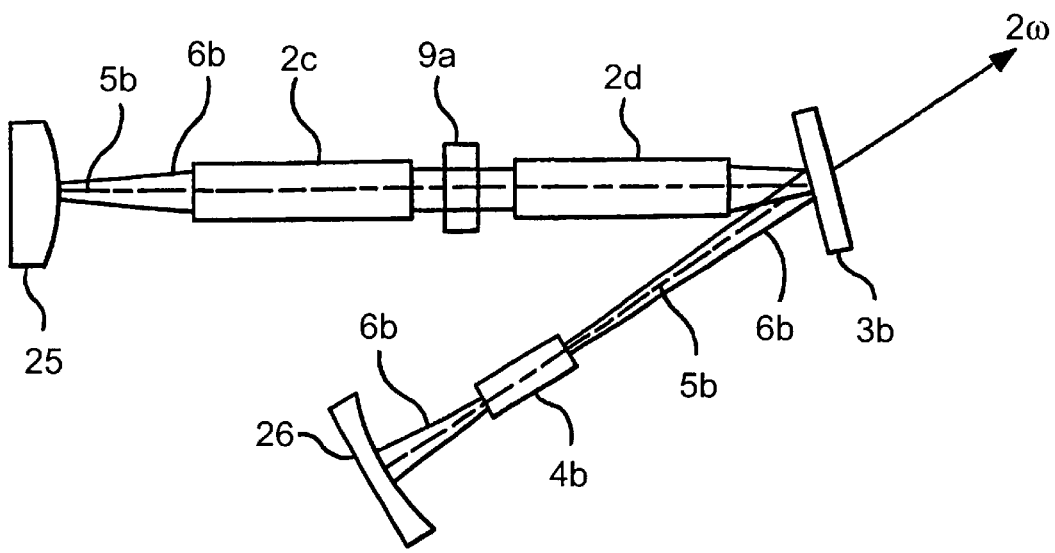
FIG. 14 is a structural view illustrating a conventional laser apparatus.
Figure 15:
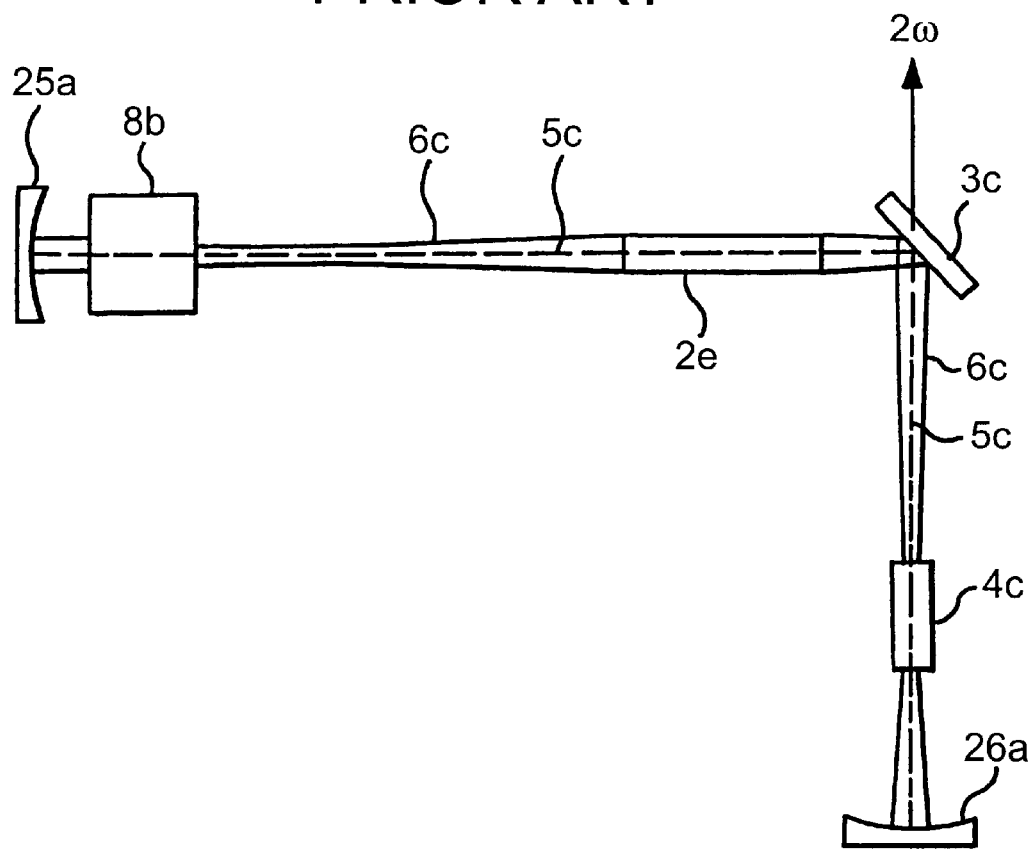
FIG. 15 is a structural view illustrating another conventional laser apparatus.

FIG. 13 is a structural view illustrating Embodiment 6. In FIG. 13, numerical reference 10b designates a laser apparatus for generating second harmonic laser beam illustrated in Embodiment 1 through 3; numerical reference 11b designates an optical axis of the second harmonic laser beam; numerical reference 13b designates a second harmonic laser beam focusing and shaping element; numerical references 19, 19a and 19b designate Ti:Sapphire laser resonator mirror, which is totally transmissive with respect to the second harmonic laser beam and totally reflective with respect to a Ti:Sapphire laser beam; numerical reference 20 designates a Ti:Sapphire crystal being another laser active medium; numerical reference 21 designates an optical axis of the Ti:Sapphire laser beam; numerical reference 22 designates the second harmonic laser beam, which is not absorbed by the Ti:Sapphire crystal; numerical reference 23 designates Ti:Sapphire laser beam and numerical reference 24 designates a Ti:Sapphire laser beam extraction mirror, which is partly transmissive with respect to the Ti:Sapphire laser beam.

In thus constructed laser apparatus illustrated in FIG. 13, a green beam, i.e. the second harmonic laser beam generated in the laser apparatus for generating the second harmonic 10b, is focused and shaped by the second harmonic laser beam focusing and shaping element 13b. After transmitting through the Ti:Sapphire laser resonator mirror 19, a part of the green light is absorbed by the Ti:Sapphire crystal. Thus absorbed green beam pumps the Ti:Sapphire crystal 20, whereby the Ti:Sapphire laser is oscillated in a resonator composed of the resonator mirrors 19, 19a, 19b, and 24. The generated Ti:Sapphire laser beam is extracted from the Ti:Sapphire laser beam extraction mirror 24.

In thus constructed laser apparatus illustrated in FIG. 13, the green light having a high output, high efficiency, and good focusibility, which is generated by the laser apparatus for generating the second harmonic, is used for pumping the Ti:Sapphire laser, whereby it is possible to provide a pumping device, which can pump the Ti:Sapphire crystal with high efficiency and high intensity. A laser active medium, which is a part of laser amplifier could also be pumped by the laser apparatus.

The first advantage of the laser apparatus according to the present invention is that the compact apparatus having the short resonator is constructed, and the Q pulse wavelength conversion laser beam having the short pulse width is generated. Further, the wavelength conversion efficiency is enhanced, and the stable apparatus which is scarcely affected by vibration of the mirror is obtainable. Further, the apparatus does not require high accuracy in the alignment of the optical elements. Further, the wavelength conversion crystal is hardly damaged.

The second advantage of the laser apparatus according to the present invention is that the highly efficient wavelength conversion is possible even with the type II phase matching LBO crystal, which has a small wavelength conversion coefficient, and it is possible to operate the laser apparatus stably for a long period without damaging the wavelength conversion crystal.

The third advantage of the laser apparatus according to the present invention is that the pump intensity region, where stable operation is obtainable, is kept to be wide, and the wavelength conversion pulse laser beam having the short pulse width is generated along with stable and highly efficient oscillation. Further, wavelength conversion efficiency is enhanced.

The fourth advantage of the laser apparatus according to the present invention is that the wavelength conversion crystal is hardly damaged despite high efficiency and a high output.

The fifth advantage of the laser apparatus according to the present invention is that the laser beam having a high output and good focusibility, which has not been obtained in the conventional technique, can be used for stable, fine, and high speed processing with high accuracy by an easy operation.

The sixth advantage of the laser apparatus according to the present invention is that a high power and highly focusible laser beam, which has not been obtained in the conventional technique, is used as a light source for external wavelength conversion; the Q pulse wavelength conversion laser beam having good focusibility and which reproducibility, which has not been obtained in the conventional technique, is highly efficiently generated; and the laser apparatus is stably operated for a long term.

The seventh advantage of the laser apparatus according to the present invention is that the laser apparatus is easily operated because the laser beam having a high output and high convergence, which has not been obtained in the conventional technique, is used as a pump source for another laser active medium; the laser beam having good focusibility generated by the other laser active medium, which has not been obtained in the conventional technique, is highly efficiently generated; and the laser apparatus is stably operated for a long term.

Obviously, numerous modifications and variations of the present invention are possible in light of the above teachings. It is therefore to be understood that within the scope of the appended claims, the invention may be practiced otherwise than as specifically described herein.

What is claimed is:

1. A laser apparatus for generating a Q pulse wavelength conversion laser beam and having a stable resonator comprising:

a solid-state laser active medium;

a resonator Q-value modulating element;

a wavelength conversion nonlinear optical crystal; and first and second resonator mirrors at opposite ends of said stable resonator, wherein said solid-state laser active medium, said resonator Q-value modulating element, and said wavelength conversion crystal are arranged along a laser optical axis of said stable resonator between said first and second resonator mirrors, and said first resonator mirror is closer to said wavelength conversion crystal than said second resonator mirror and is a convex mirror.

2. The laser apparatus according to claim 1, wherein said wavelength conversion crystal is a type II phase matching type. LBO ($LiB_3O_5$) crystal.

3. The laser apparatus according to claim 1, including a polarization controlling element within said stable resonator.

4. The laser apparatus according to claim 2, including a polarization controlling element within said stable resonator.

5. The laser apparatus according to claim 1, comprising a second wavelength conversion nonlinear optical crystal located along the laser optical axis and outside said stable resonator for wavelength conversion.

6. The laser apparatus according to claim 2, comprising a second wavelength conversion nonlinear optical crystal located along the laser optical axis and outside said stable resonator for wavelength conversion.

7. The laser apparatus according to claim 3, comprising a second wavelength conversion nonlinear optical crystal located along the laser optical axis and outside said stable resonator for wavelength conversion.

8. The laser apparatus according to claim 4, comprising a second wavelength conversion nonlinear optical crystal located along the laser optical axis and outside said stable resonator for wavelength conversion.

9. The laser apparatus according to claim 1, including a second solid-state laser active medium located along the laser optical axis for excitation by a laser beam produced by said solid state laser active medium.

10. The laser apparatus according to claim 2, including a second solid-state laser active medium located along the laser optical axis for excitation by a laser beam produced by said solid-state laser active medium.

11. The laser apparatus according to claim 3, including a second solid-state laser active medium located along the laser optical axis for excitation by a laser beam produced by said solid-state laser active medium.

12. The laser apparatus according to claim 4, including a second solid-state laser active medium located along the laser optical axis for excitation by a laser beam produced by said solid state laser active medium.

13. The laser apparatus according to claim 1, including a second harmonic mirror arranged along the laser optical axis, reflecting a laser beam produced by said solid-state laser active medium, and transmitting a second harmonic of the laser beam produced by said solid-state laser active medium.

14. The laser apparatus according to claim 2, including a second harmonic mirror arranged along the laser optical axis, reflecting a laser beam produced by said solid-state laser active medium, and transmitting a second harmonic of the laser beam produced by said solid-state laser active medium.

15. The laser apparatus according to claim 3, including a second harmonic mirror arranged along the laser optical axis, reflecting a laser beam produced by said solid-state laser active medium, and transmitting a second harmonic of the laser beam produced by said solid-state laser active medium.

16. The laser apparatus according to claim 4, including a second harmonic mirror arranged along the laser optical axis, reflecting a laser beam produced by said solid-state laser active medium, and transmitting a second harmonic of the laser beam produced by said solid-state laser active medium.

* * * * *